United States Patent
Heller et al.

(10) Patent No.: US 7,757,205 B2
(45) Date of Patent: Jul. 13, 2010

(54) SYSTEM FOR PREPARING A STANDARD FRAMEWORK FOR AUTOMATION APPLIANCES

(75) Inventors: Rainer Heller, Eckental (DE); Thomas Jachmann, Wendelstein (DE); Norbert Portner, Feucht (DE)

(73) Assignee: Siemens Aktiengesellschaft, Munich (DE)

( * ) Notice: Subject to any disclaimer, the term of this patent is extended or adjusted under 35 U.S.C. 154(b) by 1101 days.

(21) Appl. No.: 10/527,914

(22) PCT Filed: Aug. 18, 2003

(86) PCT No.: PCT/DE03/02753

§ 371 (c)(1),
(2), (4) Date: Mar. 16, 2005

(87) PCT Pub. No.: WO2004/027608

PCT Pub. Date: Apr. 1, 2004

(65) Prior Publication Data

US 2006/0142882 A1      Jun. 29, 2006

(30) Foreign Application Priority Data

Sep. 16, 2002   (DE)   ................ 102 42 916

(51) Int. Cl.
*G06F 9/44* (2006.01)
(52) U.S. Cl. .............. 717/106; 717/107; 717/108
(58) Field of Classification Search .......... 717/106–108
See application file for complete search history.

(56) References Cited

U.S. PATENT DOCUMENTS

| | | | | |
|---|---|---|---|---|
| 5,978,578 A | * | 11/1999 | Azarya et al. | 717/100 |
| 6,028,998 A | * | 2/2000 | Gloudeman et al. | 717/108 |
| 6,131,166 A | * | 10/2000 | Wong-Insley | 713/300 |
| 6,192,282 B1 | * | 2/2001 | Smith et al. | 700/19 |
| 6,336,118 B1 | * | 1/2002 | Hammond | 707/103 Y |
| 6,675,070 B2 | * | 1/2004 | Lapham | 700/245 |
| 6,701,325 B2 | * | 3/2004 | Becker et al. | 700/83 |

(Continued)

FOREIGN PATENT DOCUMENTS

DE          100 55 168 A1     2/2002

(Continued)

OTHER PUBLICATIONS

"Java Native Interface Specitication", May 16, 1997, <http://java.sun.com/products/jdk/1.2/docs/guide/jni/spec/jniTOC.doc.html>, pp. 1-67.

(Continued)

*Primary Examiner*—Wei Y Zhen
*Assistant Examiner*—Junchun Wu

(57) ABSTRACT

The invention relates to a system and a method for preparing a standardized functionality which is independent form the type of appliance and is used to create a solution in the field of automation. The specific properties and functions of different automation systems are directly covered or generalized on respective appliances by a system-specific adapter, the automation runtime layer. Another component implemented on the respective appliance, the runtime framework, provides a general automation functionality and/or base functionality. The automation solution can thus be created in a standardized manner on an engineering system, and randomly ported independently from the respective target platform. Uniform object libraries can be used and already created solutions can be recycled independently from the system.

14 Claims, 1 Drawing Sheet

U.S. PATENT DOCUMENTS 6,882,890 B2 * 4/2005 Horn et al. .................. 717/108
7,293,261 B1 * 11/2007 Anderson et al. ........... 717/136
2002/0073094 A1 * 6/2002 Becker et al. ............... 707/102

FOREIGN PATENT DOCUMENTS

DE 10055168 A1 2/2002

OTHER PUBLICATIONS

J. Strong, J. Wegstein, A Tritter, J. Olsztyn, O. Mock, T. Steel; "The Problem of Programming Communication with Changing Machines"; vol. 1, No. 8; pp. 12-18; XP-002320975. , 1958.

Strong et al., "The Problem of Programming Communication with Changing Machines", pp. 12-18, XP-002320975. , 1958.

Jav a Native Interface Specification, retrieved from Internet: http://jaa.sun.com/products/jdk/1.2/docs/guide/ini/spec/iniTOC.doc.html; May 16, 1997.

* cited by examiner

SYSTEM FOR PREPARING A STANDARD FRAMEWORK FOR AUTOMATION APPLIANCES

CROSS REFERENCE TO RELATED APPLICATIONS

This application is the U.S. National Stage of International Application No. PCT/DE2003/002753, filed Aug. 18, 2003 and claims the benefit thereof. The International Application claims the benefits of German application No. 10242916.2 filed Sep. 16, 2002, both applications are incorporated by reference herein in their entirety.

FIELD OF THE INVENTION

The invention relates to a system and a method for providing a standardized appliance-independent functionality for developing control software for automation systems.

SUMMARY OF THE INVENTION

In today's automation environment, automation appliances of differing designs each possess their own programming interfaces and have a command set of their own which is used in the programming or implementation of an automation solution on the respective appliance. Due to these differences, the various automation systems needed as part of an automation solution (appliances of a uniform design) are programmed differently. The programming is carried out on a very low level, i.e. comparable to assembler programming, a simple syntax is used. Thus, in order to implement a complex automation solution, a large number of simple commands is needed. The automation solutions which emerge in this way are developed specifically for the particular automation systems and, due to their specific nature, cannot be transferred to other automation systems, which in each case have yet another command set. At present, therefore, a high programming effort is required to implement specific solutions. The transfer of programs between differing automation systems is not possible, above all due to the fact that basic mechanisms of automation, such as the addressing of counters or the downloading of blocks on each appliance type are represented differently. Accordingly, the various automation systems today are viewed as individual systems. Each system has its own special implementation and its own programming interface. The result of this is a large number of specific compilers which translate the respective automation programs for appropriate target systems. In addition, the programming environments for developing an automation solution differ greatly between the individual automation systems. Thus, for example, downloading, i.e. the downloading of developed software, and debugging, the removal of faults in the program code, are implemented differently for the respective automation systems. For this reason, experts exist for the programming of individual systems. Only few of these experts master different automation systems equally well and know their respective specific characteristics.

The object of the present invention is to enable a standardized and simplified programming and implementation of automation solutions for various automation systems.

This object is achieved in a system for providing an appliance-independent or device-independent functionality for automation appliances (e.g. automation devices), said system comprising first means for encapsulating specific functions of at least one automation appliance and for providing a base functionality of the automation appliance, and second means, superimposed upon the first means, for providing a general functionality and/or automation functionality. This object is further achieved by a method, a programming language, and a respective automation device.

The invention is based upon the recognition that in the automation field at present a heterogeneous hardware environment is generally encountered. In developing an automation solution for a system, the programmer is consequently confronted with various automation appliances, each of which understands its own language. In order to simplify the development of a solution, it is proposed that a uniform environment be created in which automation solutions for different automation systems can be developed in a standardized way. To this end, a standard framework for automation appliances is provided. The standard framework forms an abstraction of the underlying hardware, that is of the automation appliances, and in doing so makes available both a general functionality such as, for example, downloading or the addressing of inputs and outputs, and also an automation functionality such as, for example, the provision of diagnostic data or the forcing of variables. The defined standard framework is specifically tailored to the concerns of automation technology and offers inter alia a standardization of the runtime environment for various automation appliances as well as the facility for encapsulating specific hardware properties. Classes of the framework are used here for developing the program, which runs on a specific hardware. An automation solution can thus be implemented which is based upon the functions and automation objects of the standard framework. The standardized functionality of the framework is provided here by the automation appliances themselves. For this purpose, means are implemented on the automation appliances for encapsulating specific functions of the automation appliances and for providing a base functionality in the form of the automation runtime layer (ARL). The ARL provides basic services which abstract from and are independent of the respective hardware, i.e. the automation appliance. These include, for example, framing, synchronization, memory management, markers and counters. The ARL is fashioned to be platform-specific and has the task of covering all platform-specific functions. Superimposed on the ARL are means for providing a general functionality in the form of the runtime framework (RF). Here, the RF offers higher-level services and, in addition to general functionality (such as memory management, threading, synchronization, etc.), also provides automation functionality. In contrast to the ARL, implementation of the RF is not platform-specific. Consequently, a single implementation can with little effort be ported onto different target platforms, i.e. automation systems. It is advantageous here above all that in developing automation solutions the provision of general automation services which can be used generally is enabled. Use of the proposed system leads to a simplification of the implementation of individual automation components. The services for accessing the automation appliances and for accessing automation-specific objects, alarms and process values are standardized. Abstraction from specific hardware, i.e. independence from specific automation systems, enables hardware-independent programming of the automation components. Specific expert knowledge, tailored to an automation system, is thus no longer necessary for developing the automation solution. Using the proposed system renders the time-consuming development of special program code on a relatively low level redundant; instead, it enables programming using high-level programming languages. This enables the programmer to concentrate on the solution of actual automation-specific problems instead of having to invest his/her resources in the generation of rudimentary program components. Furthermore, the standard framework ensures universality in the diagnosis and analysis of faults which extend beyond the boundaries of the automation systems. Also, the interaction of various components which are implemented in an automation solution is easier to analyze or to debug. Use of the standard framework offers the facility for developing higher-value supplementary packages offering objects and functions which can then likewise be independent of the target platform. Such technological objects or supplementary packages can be filed within the system in the form of libraries, so as to be available for recurring automation tasks. In addition, use of the standard framework enables the porting of automation solutions across different appliance families.

A further advantageous embodiment of the invention is characterized in that the first means for covering specific functions are fashioned as automation-appliance-specific adapters. The automation-appliance-specific properties are thus standardized by the ARL on a relatively low level in the overall system so that they are available in the form of commands generally comprehensible to a programming system. This ensures that all automation appliances can be uniformly addressed on a low level. Standardization on a higher hierarchical level within an automation system would possibly result in a loss of automation-appliance-specific properties. The use of specific adapters, by contrast, ensures that all properties can also be made available in a general form.

A further advantageous embodiment of the system is characterized in that the means for providing a general functionality and/or automation functionality are fashioned so as to be appliance-independent. The advantage here is that general functionality such as, for example, the implementation of downloading does not have to be integrated in the appliance-specific ARL. In particular, automation functionality which is independent of specific automation appliances, such as, for example, the performance of diagnostics, does not have to be implemented on the specific ARLs. Due to the fact that these functionalities are appliance-independent, they have only to be implemented once and can then independently be used automation-appliance-specifically. This enables a one-off development of the runtime framework (RF).

A further advantageous embodiment of the invention is characterized in that the system is provided for use by a development system for developing control software. The standardized and appliance-independent functionality provided by the system can by this means advantageously be used by an ordinary automation-engineering editor, a programming tool or an engineering system in general. This advantageous embodiment enables the simpler, faster and more cost-effective manufacture of control software.

A further advantageous embodiment of the invention is characterized in that the system is provided for providing technological objects for automation appliances. Objects such as, for example, an elevating platform, a conveyor belt or a tank can, if they can be mapped in the form of generally reusable functions, be filed in the form of a library. These technological objects are then available to the programmer with their properties and methods for implementing an automation solution as standard. The programming effort is substantially reduced by these predefined objects.

A further advantageous embodiment of the invention is characterized in that a memory is provided for storing automation solutions for recurring tasks. The automation solutions already implemented can be filed on the automation appliance and are available for reuse in new automation solutions. They are known to an engineering system used for developing control software [lacuna]. This enables faster development and also the use of already existing solution knowledge.

A further advantageous embodiment of the invention is characterized in that the system is provided for using an internet and/or intranet for transmitting data. This enables, for example, the installation of an engineering system used for programming, said installation being independent of the location of the automation appliances. A developed automation solution can be sent via the internet or the intranet to the respective target automation appliances. The sending of programmed solutions in the form of diskettes or other data media is rendered unnecessary by this embodiment of the invention.

A further advantageous embodiment of the invention is characterized in that a programming language, designed specifically for automation, for developing control software is provided as a target language of development systems and as a target platform for mapping to the first means (the RF) on an automation appliance. Implementation of this automation-specifically designed intermediate language for automation solutions offers the advantage that specific programming languages which are currently used in automation engineering by the development systems can be mapped to a single programming language as target language. The advantage here is that suitable editors and development systems can be used for developing the solution for solving an automation task. These editors and development systems each have their own programming language which is then translated into the automation intermediate language (AIL). Subsequent use of the AIL ensures that the special automation tasks which have been solved with the aid of the respective editors later work together smoothly. An advantage here is also that an abstraction of the programming tools is produced by the underlying hardware. Use of the AIL also enables the uniform debugging or fault analysis of the developed automation solution, since the different programming languages have been translated in advance into a uniform language. Use of the AIL thus enables for the first time the use of a standard debugger. This enables access from the PC right down to control level.

A further advantageous embodiment of the invention is characterized in that compilers (5) are provided for mapping the language to the target platform. The programming tools have to concentrate exclusively on mapping to the AIL. Translation into the hardware-specific version is carried out by the special compilers. The corresponding solution does not have to be implemented to suit a specified target platform. This forms the basis for the development of hardware-independent automation components. An automation solution runs on an automation appliance precisely when the requirements for the respective ARL are met. The number of compilers needed for this is reduced since not every possible editor/automation system combination needs its own compiler. Only system-specific or editor-specific compilers into the AIL and from the AIL are needed.

BRIEF DESCRIPTION OF THE DRAWINGS

The invention is described in more detail below with reference to the exemplary embodiments shown in the drawings, in which.

DETAILED DESCRIPTION OF THE INVENTION

Figure 1:
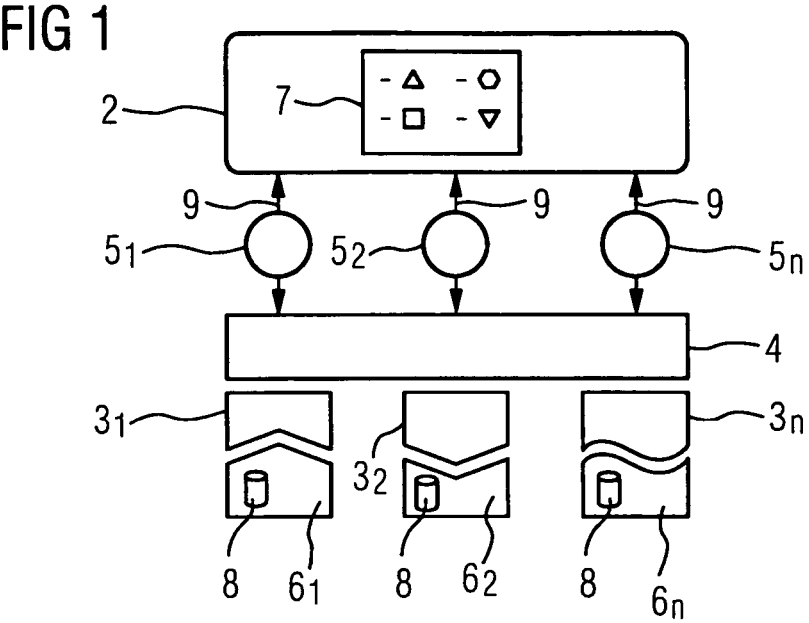
FIG. 1 shows a schematic diagram of an exemplary embodiment of the standard framework for automation systems.

FIG. 1 shows a schematic diagram of an exemplary embodiment of a standard framework for providing appliance-independent standardized functionality for different automation systems $6_{1...n}$. Superimposed on the automation systems $6_{1...n}$ are system-specific adapters $3_{1...n}$, called automation runtime layers (ARL). The ARLs $3_{1...n}$ cover automation-appliance-specific functions and provide a base functionality of the automation systems $6_{1...n}$. Superimposed on the adapters $3_{1...n}$ are automation-system-independent runtime frameworks (RF) 4. The RFs 4 provide a general functionality and automation functionality. The automation solution is developed with the aid of an engineering system 2. A library with technological objects 7 can be accessed for this purpose. Automation solutions which have already been implemented can be filed for reuse in a memory 8 on the automation appliances. The software developed by means of the engineering system is translated with the aid of the compilers $5_{1...n}$ into a runtime version for the respective automation systems $6_{1...n}$. The data is transferred with the aid of a data transmission appliance 9.

The special feature of the system shown in FIG. 1 consists in the fact that a standardized, appliance-independent automation solution can be developed on a random engineering system 2. This special feature is ensured by the fact that the automation-system-specific properties are covered with the aid of the ARLs $3_{1...n}$. In interaction with the system-independent RF 4, which provides further functionality, a unified layer is available on the automation appliances $6_{1...n}$, on which layer an automation solution can be implemented with the aid of higher-value programming languages. This enables the use of general components such as, for example, the technological objects 7 which are available to the engineering system. A specific implementation of the respective solution for the individual automation systems $6_{1...n}$ is in this manner rendered unnecessary. Once developed, solutions can be reused appliance- and system-independently. The respective compiler $5_{1...n}$ then ensures that there is an appropriate translation of the general program code into a form which can be interpreted by the respective automation system $6_{1...n}$. In general, implementation of an automation system is simplified enormously by the proposed system: automation-system-specific expert knowledge is no longer necessary and reuse of already implemented solutions is possible.

Figure 2:
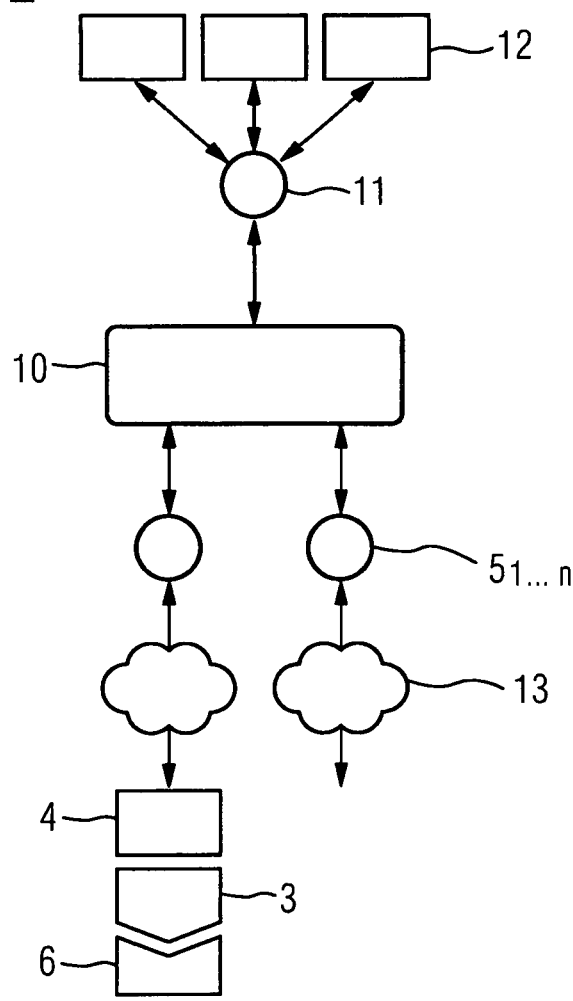
FIG. 2 shows a schematic diagram of the use of an automation-specific intermediate language.

FIG. 2 shows an example of the use of an automation-specific programming language as an intermediate language 10 between programming languages of automation-engineering editors 12 and automation-appliance-specific languages. The program codes developed by means of automation-specific editors 12 are translated with the aid of specific compilers 11 into the intermediate language 10. From the intermediate language, the instructions are translated by means of compilers $5_{1...n}$ into automation-system-specific instructions. Here, the data can be transmitted to the automation appliances $6_{1...n}$ via an intranet or internet 13.

The essential advantage of the embodiment of the system with an intermediate language 10 for automation systems (AIL=automation intermediate language) shown schematically in FIG. 2 consists in the fact that the quantity of compilers which have to be used for developing an automation solution can be reduced substantially. Without the use of an AIL, each programming language of an automation-specific editor $12_{1...m}$ that is used has to be translated by means of a special compiler for the particular target platform $6_{1...n}$. This gives rise to a quantity of n*m compilers for a quantity of m editors and n automation appliances. In using the intermediate language 10, the compilers $11_{1...m}$ translate their source code into the intermediate language 10. From the intermediate language, the code is translated with the aid of system-specific compilers $5_{1...n}$ into the language of the target platform $6_{1...n}$. Where the AIL is used, only n+m compilers are thus required in order to implement a specific automation solution. Also, a large part of the implementation can be developed within the AIL itself. The development of an automation solution is consequently simplified many times over.

To summarize, the invention relates to a system and a method for providing standardized appliance-independent functionality for developing a solution in the field of automation. The specific properties and functions of different automation systems $6_{1...n}$ are directly covered or generalized on the respective appliances by a system-specific adapter, the automation runtime layer (ARL) $3_{1...n}$. A further component implemented on the respective appliance, the runtime framework (RF) 4, provides a general automation and/or base functionality. The automation solution can thus be developed in a standardized manner on an engineering system 2 and randomly ported independently of the respective target platform $6_{1...n}$. Uniform object libraries 7 can be used and solutions already developed can be reused independently of the system.

LIST OF REFERENCE SYMBOLS

2 Appliance for programming and implementing an automation solution
3 Means for encapsulating specific functions (adapter)
4 Means for providing a general functionality
5 Compiler
6 Automation appliance
7 Technological objects
8 Memory
9 Data transmission appliance
10 Intermediate language
11 Compiler
12 Automation-engineering editors
13 Intranet/internet

The invention claimed is:

1. A non-transitory storage medium which stores a software system for providing a programming environment to create device-independent functionality among automation devices in an automation system of the type including a plurality of automation devices, the system comprising:
one or more automation engineering editors for generating an automation program for multiple ones of the automation devices;
a compiler for translating the automation program into an intermediate language in a runtime framework for further translation into different instructions for automation devices in different automation systems; and
an automation device-specific adapter for each of the automation devices, each adapter providing a translation of the automation program into instructions which can be interpreted by an automation device in a different automation system, the software system providing encapsulation of specific functions of the automation devices and providing a base functionality of the one-automation devices, the editors and compiler providing an automation functionality in a standard framework for application among automation devices having different command sets for being programmed.

2. The non-transitory storage medium according to claim 1, wherein the software system is provided for developing control software in the automation system.

3. The non-transitory storage medium according to claim 1, wherein the software system provides technological objects for automation devices and, when the system includes m editors and n automation devices, at most, only n+m compilers are required to implement the automation program.

4. A system including the non-transitory storage medium according to claim 1, further comprising: a memory for storing automation programs for recurring tasks.

5. The system according to claim 4, adapted for using the Internet and/or an intranet for transmitting data.

6. The non-transitory storage medium according to claim 1, wherein an automation-specifically designed programming language is used for developing control software for the automation system.

7. A method for providing device-independent functionality for automation devices, the method comprising:
   providing a compiler for receiving an automation program from one or more automation engineering editors and translating the automation program into an intermediate language in a runtime framework for further translation into different instructions for automation devices in different automation systems: and
   providing an automation device-specific adapter for each of the automation devices, each adapter providing a translation of the automation program from the intermediate language into instructions which can be interpreted by an automation device in a different automation system, the software system providing encapsulation of specific functions of the automation devices, the editors and compiler providing an automation functionality in a standard framework for application among automation devices having different command sets for being programmed.

8. The method according to claim 7, wherein automation functionality is provided independent of the automation device.

9. The method according to claim 7, wherein a development system is used for developing control software.

10. The method according to claim 7, further comprising: providing technological objects for the automation devices.

11. The method according to claim 7, further comprising: storing automation programs for recurring tasks.

12. The method according to claim 6, wherein the Internet an intranet is used for transmitting data.

13. The method according to claim 7 including providing a programming language automation-specifically adapted for developing control software.

14. The method according to claim 13, wherein compilers are provided for mapping the intermediate language onto a target platform.

* * * * *